(12) United States Patent
Muramatsu

(10) Patent No.: US 6,519,429 B2
(45) Date of Patent: Feb. 11, 2003

(54) IMAGE PROCESSING DEVICE, IMAGE PROCESSING METHOD, AND PROGRAM REALIZING THE IMAGE PROCESSING METHOD

(75) Inventor: Hideo Muramatsu, Shinshiro (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/013,476

(22) Filed: Dec. 13, 2001

(65) Prior Publication Data

US 2002/0071690 A1 Jun. 13, 2002

(30) Foreign Application Priority Data

Dec. 13, 2000 (JP) .......................................... 2000-378356

(51) Int. Cl.$^7$ ............................................... G03G 21/00
(52) U.S. Cl. ............................. 399/82; 399/81; 399/83; 399/85
(58) Field of Search ............................. 399/81, 82, 83, 399/85, 86, 87; 345/173

(56) References Cited

U.S. PATENT DOCUMENTS 5,500,717 A  *  3/1996  Altrieth, III .................. 399/81
5,614,993 A  *  3/1997  Smith et al. .................. 399/81
5,669,040 A     9/1997  Hisatake

FOREIGN PATENT DOCUMENTS

JP          A-9-151024         10/1997

* cited by examiner

Primary Examiner—Hoang Ngo
(74) Attorney, Agent, or Firm—Burns, Doane, Swecker & Mathis, LLP

(57) ABSTRACT

An image processing device is made convenient for a user to specify and cancel jobs one by one when there are a plurality of recorded jobs containing image data a user wants to cancel. The operating unit of the image processing device receives a cancellation command from a user and executes memory recall and extracts the image data for a job which is the target of a cancellation command when a document reading operation is not being executed and when a print operation is not being executed. Then, all jobs including such image data are extracted, and the target job table of the destruction command and other jobs including the image data included in the target job are extracted from the memory unit of the image processing device and canceled.

14 Claims, 14 Drawing Sheets

Image Management Table

Job Management Table

Memory Recall   [Cancel Changes]

Press Start Key to Start Print.
Enter Number of Copies by ten keys.    1

Available Mode Changes    [OK]

[Finishing]  [Origin→Copy]  [Paper]

[Date]  [Page]  [Management No.]

[Format Printing]        111 — [Erase]

Extract Related Job    [Cancel]

| No. | Page | Record | Finish | Status | Source |
|---|---|---|---|---|---|
| ① | 5 | 10:09 | 10:55 | Waiting | Copy |
| ② | 99 | 10:12 | 11:00 | Waiting | Copy |
| ③ | 20 | 10:19 | 11:05 | Waiting | Copy |

Do you erase all jobs?

[Yes]  [No]

FIG. 10

Job Confirmation

[NEXT] [OK]
[Confirm Setting] [Change] [ADD] [Delete]

| No. | Origin | Copy | Record | Finish | Status | Source |
|---|---|---|---|---|---|---|
| ① | 999 | 999 | 10:05 | 10:50 | Printing | Copy |
| ② | 1 | 5 | 10:09 | 10:55 | Waiting | Copy |
| ③ | 9 | 99 | 10:12 | 11:00 | Waiting | Copy |
| ④ | 19 | 20 | 10:19 | 11:05 | Waiting | Copy |
| ⑤ | 999 | 52 | 11:05 | 11:15 | Reading | Copy |

FIG. 15

Job Adding  [Cancel Adding]

Select Mode to Change.
Enter Number of Copies by ten key.   1

Available Mode Changes   [Record]

[Fininshing] [Origin→Copy] [Paper]
[Date] [Page] [Management No.]
[Format Printing]

FIG. 16

IMAGE PROCESSING DEVICE, IMAGE PROCESSING METHOD, AND PROGRAM REALIZING THE IMAGE PROCESSING METHOD

This disclosure is based upon, and claims priority from, Japanese Application No. 00-0378356 filed Dec. 13, 2000, the contents of which are incorporated herein by reference.

BACKGROUND OF THE INVENTION

1. Field of the Invention

The present invention relates to image processing devices, and more specifically relates to the automatic extraction and cancellation of jobs containing the same image data from among a group of recorded jobs.

2. Description of the Related Art

In the conventional art relating to a recorded print job, image processing devices are capable of changing the print mode of a print job after the print job has been recorded.

There are also image processing devices having a plurality or types of settings with names attached of only those print modes recorded beforehand as mode types, so as to be capable of processing the same image data in different print modes by a user outputting a job of image data corresponding to a desired mode type. In this case, the image processing device is provided with a memory, such that when a user selects a plurality of desired individual mode types, the device is capable of recording a plurality of print jobs corresponding to a plurality of print modes relative to one set of image data (i.e., a plurality of print jobs having common image data and differing only in print mode).

In this image processing device, when a command is generated to cancel all jobs containing specific image data after a user sets a plurality of types of modes for the specific image data, a new problem arises in as much as a user must extract the jobs from among a group of other recorded jobs and specify each job one by one for destruction.

This problem greatly increases the work of the user, and although a function of the image processing device is capable of recording a job having a changed mode as a new job, this function is not greatly convenient for the user.

An object of the present invention is to eliminate the problems of the conventional image processing device by providing an image processing device, image processing method, and recording medium for recording a program to realize the image processing method which is more convenient for a user.

SUMMARY OF THE INVENTION

These objects are attained by an image processing device comprising, in one aspect of the present invention, a first input device for inputting image data, a second input device for inputting a print mode, a first recording means for recording a job in accordance with image data input by the first input device and print mode input by the second input device, a memory for storing a job recorded by the first recording means, a mode changer for changing a print mode input by the second input device, a second recording means for recording as a new job the image data input by the first input device in accordance with a print mode changed by the mode changer, a receiving means for receiving a cancellation command specifying a specific job among a group of jobs already recorded by the first and second recording devices, an extracting means for automatically extracting another job having identical image data but only a different print mode as the job specified by the cancellation command, and a destroying means for destroying a job specified by the cancellation command, and another job extracted by the extracting means.

It is desirable that a memory recall function capable of recalling and outputting a job stored by the memory be provided, wherein the mode changer is effective only when the memory recall function is operational.

It is further desirable that the timing is specified from the start of reading of the memory recall target job until cancellation of the memory recall function when the memory recall means is operational.

These objects are attained by an image processing method comprising, in another aspect of the present invention, a first input step of inputting image data, a second input step of inputting a print mode, a first recording step of recording a job in accordance with image data input in a first input step and a print mode input in a second input step, a memory step for storing a job recorded by the first recording step, a mode changing step for changing a print mode input in the second input step, a second recording step for recording as a new job the image data input in the first input step in accordance with a print mode changed in the mode changing step, a receiving step for receiving a cancel command specifying a specific job among a group of jobs already recorded in the first and second recording steps, an extracting step for extracting another job having identical image data but only a different print mode as the job specified by the cancel command, and a destroying step for destroying a job specified by the cancel command, and another job extracted during the extracting step.

These objects are attained by an image processing method comprising, in another aspect of the present invention, a program for realizing an image processing method which is a program for realizing the aforesaid image processing method.

BRIEF DESCRIPTION OF THE DRAWINGS

FIG. 9 shows the memory recall screen displayed on the liquid crystal touch panel FIG. 10 shows the related job extraction screen displayed on the liquid crystal touch panel;

FIG. 15 illustrates the job confirmation screen displayed on the liquid crystal touch panel;

FIG. 16 illustrates the job supplement screen displayed on the liquid crystal touch panel.

DESCRIPTION OF THE PREFERRED EMBODIMENTS

First Embodiment

Figure 1:
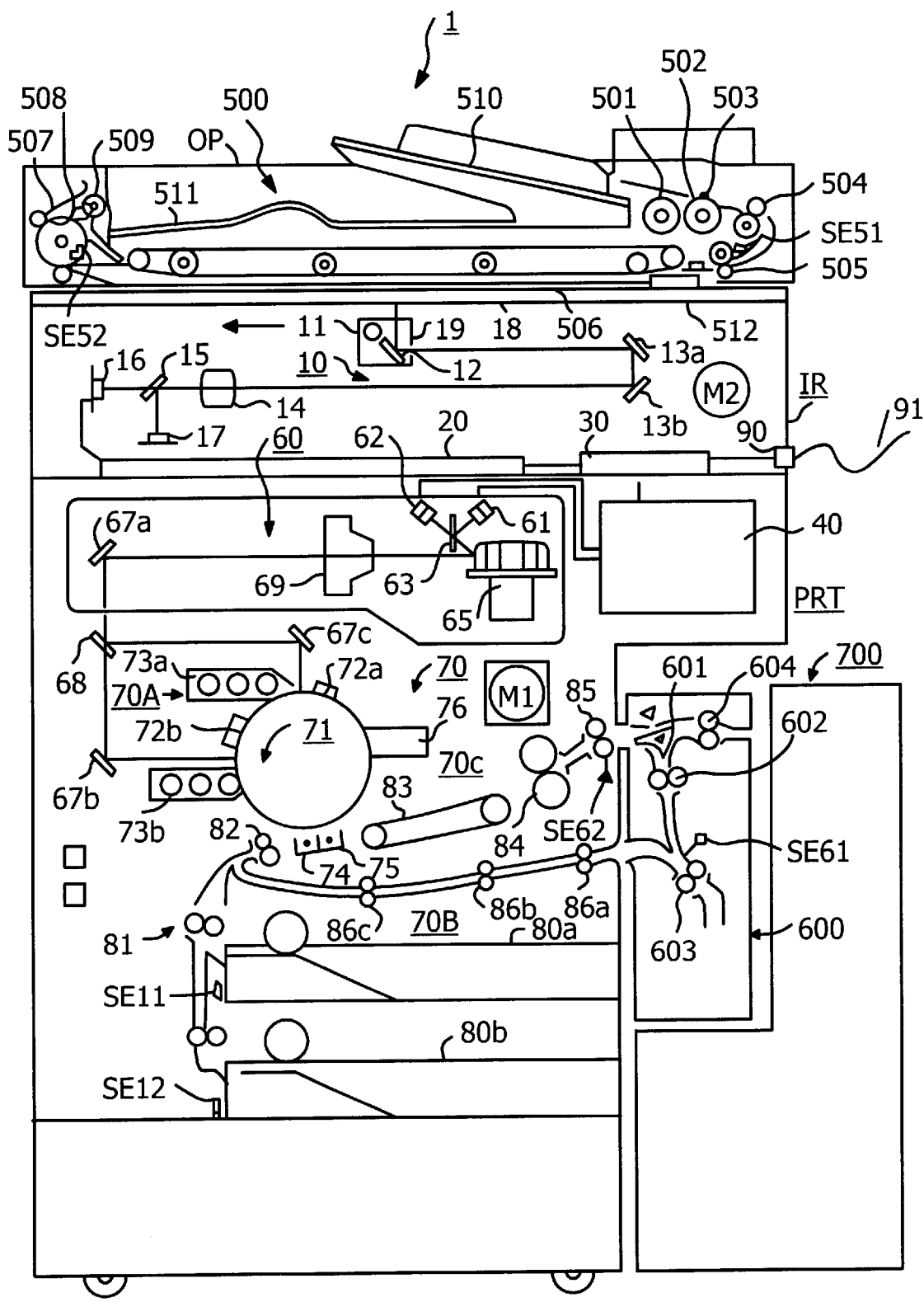
FIG. 1 is an elevation cross section view showing the overall structure of a copier of a first embodiment of the present invention.

FIG. 1 is an elevation cross section view showing the overall structure of a digital copier 1 (an example of an image processing device) of a first embodiment of the present invention. The digital copier 1 (hereinafter referred to as "copier 1") comprises a scanning system 10 for reading and converting a document to image signals, image signal processor 20 for processing image signals sent from the scanning system 10, memory unit 30 for storing image data input from the image signal processor 20, optical system 60 for directing two laser beams from two semiconductor lasers 61 and 62 to different exposure positions on a photosensitive drum 71 based on image data input from the memory unit 30, image forming system 70 for forming an image by developing the latent image formed by exposure and transferring and fixing the image to a sheet, operation panel OP provided on the top of the body of the copier 1, document feeder 500 for transporting a document and reversing a document front-to-back as necessary, sheet re-feeder 600 for supplying a sheet again to the transfer position, and a sorter 700 for discharging and sorting sheets into bins.

An image reading device IR is comprised of the scanning system 10 and image signal processor 20, and a printing device PRT is comprised of a print processor 40, optical system 60, and image forming system 70.

The scanning system 10 comprises an exposure lamp 11 mounted on a scanner 19 which moves below a glass document table 18, a first mirror 12, second mirror 13a, third mirror 13b, condensing lens 14, dichroic mirror 15, photoelectric conversion elements 16 and 17 such as a CCD array or the like, and a scanning motor M2.

The dichroic mirror 15 reflects light of specific color e.g., red color light, and transmits light of complementary colors of the specific color among light reflected from a document. The photoelectric conversion elements 16 and 17 convert the specific color (red color) of an image into individual electric signals.

The image signal processor 20 processes the image signals output from the two photoelectric conversion elements 16 and 17, identifies each pixel of a document image as a specific color (second color), and other colors (first color), and outputs image data with attached color data to the memory unit 30.

The memory unit 30 compresses and temporarily stores the image data received from the image signal processor 20, and subjects the compressed data to an expansion process and transmits the image data to the printing device PRT. At this time, a rotation-editing process is performed as necessary.

The memory unit 30 has an external device interface, so as to be connectable to an external device such as a personal computer and the like through an external cable 91 via an external device connector 90.

A print processor 40 distributes the received image data with attached color data to the two semiconductor lasers 61 and 62 in accordance with the data, and delays the image data sent to one semiconductor laser 61 in accordance with the difference in exposure positions corresponding to the two semiconductor lasers 61 and 62. An optical system 60 comprises a dichroic mirror 63 for combining the two laser beams of the semiconductor lasers 61 and 62, a polygonal mirror 65 for deflecting the combined laser beam, main lens 69, reflecting mirror 67a, dichroic mirror 68 for splitting the combined laser beam into the two original laser beams, and reflecting mirrors 67b and 67c.

An image forming system 70 comprises a developing-transfer system 70A, transport system 70B, fixing system 70C, and main motor M1.

The developing-transfer system 70A comprises a photosensitive drum 71 which is rotatable in the counterclockwise direction in FIG. 1, and arranged sequentially around the periphery of the drum 71 on the upstream side therefrom in the direction of rotation are a first charger 72a, first developing device 73a, second charger 72b, second developing device 73b, transfer charger 74, separation charger 75, and cleaning unit 76. The first developing device 73a accommodates a two-component developer formed of a carrier and a red color toner corresponding to the second color, and the second developing device 73b accommodates a two-component developer formed of a carrier and black color toner corresponding to the first color.

The transport system 70B comprises cassettes 80a and 80b which accommodate paper sheets, size sensors SE11 and SE12 for detecting the size of paper sheets, paper guide 81, timing roller 82, transport belt 83, and horizontal transport rollers 86a, 86b, 86c for transporting paper sheets fed into the sheet re-feeder 600.

The fixing system 70C comprises a fixing roller 84 for heat-fixing and transporting a paper sheet, discharge roller 85, and discharge sensor SE62 for detecting a discharged sheet.

The sheet re-feeder 600 comprises a switch 601 for switching between re-feeding and discharging to the sorter 700, a transport roller 602, inversion roller 603, discharge roller 604, and inversion sensor SE61. The sheet re-feeder 600 is a recirculation system which temporarily accommodates a sheet discharged from the discharge roller 85, inverts the sheet front-to-back when the duplex mode is set, and does not invert the sheet front-to-back when the composite mode is set, and feeds the sheet to horizontal transport roller 86a of the transport system 70B again for image formation (printing).

In the duplex mode, the left edge of the switch 601 is moved upward by a solenoid not shown in the drawing, such that a sheet discharged from the discharge roller 85 is directed to the transport roller 602, passes the transport roller 602, and reaches the inversion roller 603. When the trailing edge of the sheet reaches the inversion sensor SE61, the inversion roller 603 reverse rotates so as to transport the sheet toward the horizontal transport roller 86a, and awaits the sheet passing the horizontal transport roller 86b and arrival at the timing roller 82. At this time, a next sheet is also transported at a sequential specific spacing, and the number of one-sided copy sheets on standby is dependent on the length of the sheet when image data are not delayed.

The document feeder 500 comprises a feed roller 501, pick-up roller 502, pick-up pad 503, intermediate roller 504, registration roller 505, transport belt 506, inversion roller 507, switch 508, discharge roller 509, document tray 510, document discharge unit 511, document scale 512, sheet sensor SE51, and discharge sensor SE52. The document feeder 500 transports a document set on the document tray 510 automatically onto the glass document table 18, and after reading the document via the scanner 19, ejects the document to the document discharge unit 511.

A document set comprising one or a plurality of sheets is set on the document tray 510, and in the one-sided mode a single side is read, whereas in the duplex mode each document is inverted and both sides are read. For example, in the single-side mode, a document set is sequentially transported from the lowermost sheet by the feed roller 501, and the document is picked up by the pick-up roller 502 and pick-up pad 503, passes the intermediate roller 504, its inclination is corrected by the registration roller 505, the sheet is then transported by the transport belt 506 onto the glass document table 18, and directly after the trailing edge of the document has passed the left edge of the document scale 512, the transport belt 506 is slightly reversed and stopped. In this way, the right edge of the document (trailing edge) abuts the edge of the document scale 512, so as to properly position the document on the glass document table 18. In this state, the scanner 19 scans and reads the surface (bottom side) of the document. When the document reading ends, the document is transported leftward by the transport belt 506, makes a U-turn via the inversion roller 507, passes above the switch 508, and is ejected onto the document discharge unit 511 via the discharge roller 509. These operations are repeated until there are no documents left on the document feeder 510.

Image data of a read document are stored in the memory unit 30 simultaneously with the reading of the document, and the job of reading one set of documents is completed by reading all the consecutive documents in the set. The image data of one set of documents stored in the memory unit 30 are managed by an image data table described later.

Figure 2:
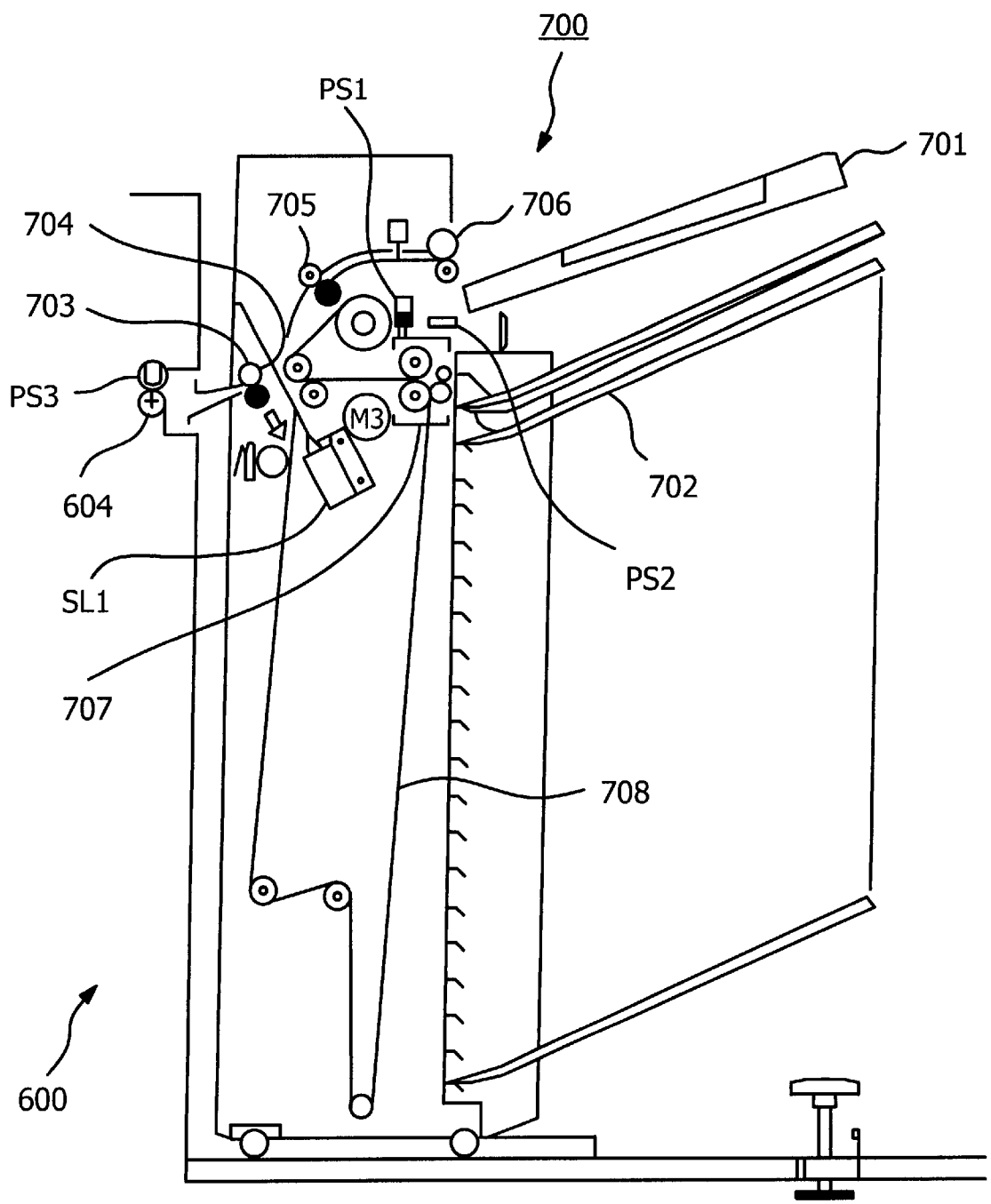
FIG. 2 is an elevation cross section view showing details of the structure of the copier of FIG. 1.

FIG. 2 is an elevation cross section view showing details of the structure of the sorter 700 shown in FIG. 1. The sorter 700 is disposed at the side of the re-feeder 600 shown in FIG. 1, and comprises a take-up roller 703 for taking up a copy sheet discharged from the re-feeder 600, switch guide 704 for switching the transport direction of the taken up copy sheet, transport roller 705 for transporting a copy sheet onto a discharge tray 701, discharge roller 706, guide unit 707 for sorting and transporting sheets onto a sort bin 702, and transport belt 708. The sorter 700 sorts a plurality of copy sheets discharged by the discharge roller 604 in the re-feeder 600 onto the discharge tray 701 or to sort bins 702 arranged in plurality in a vertical direction at a position below the discharge tray 701.

The switch guide 704 is switched via the ON/OFF state of a solenoid SL1, such that a copy sheet is either discharged onto the discharge tray 701 or onto a sort bin 702.

The guide unit 707 is raised and lowered by a discharge bin switching motor M3, and as a result a sheet is sorted to a specific sort bin 702. Detection of the upper limit position in the raising and lowering movement of the guide unit 707 is accomplished by a top bin sensor PS1, jam detection is accomplished by a jam sensor PS2, detection of a sheet discharged by the discharge roller 604 is detected by a discharge sensor PS3.

Figure 3:
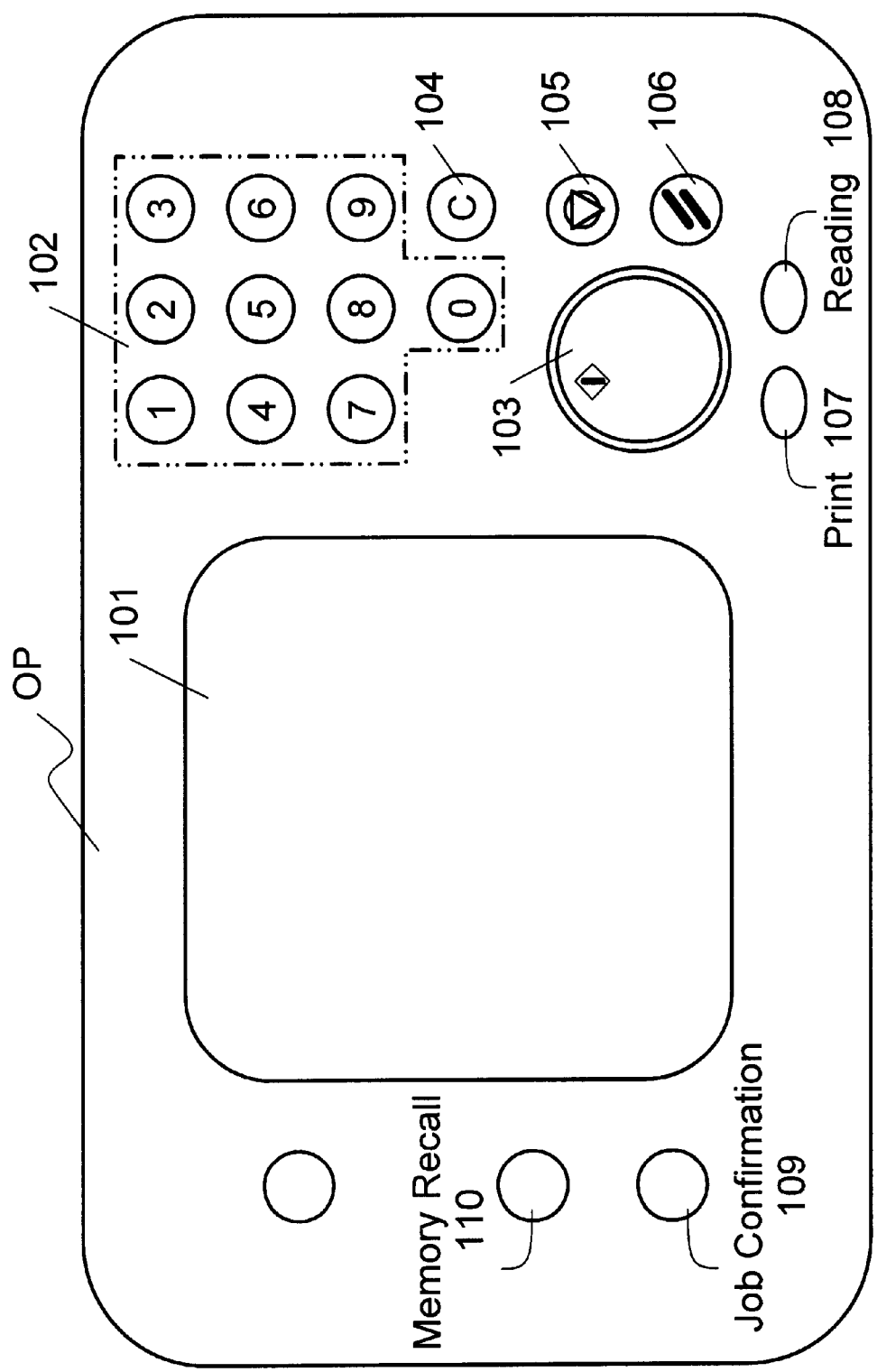
FIG. 3 is a plan view of the operation panel OP provided on the top of the body of the copier.

FIG. 3 is a plan view of the operation panel OP provided on the top of the body of the copier 1.

The operation panel OP is provided with a liquid crystal touch panel 101 for displaying conditions and various mode settings, ten-key pad 102 for entering a copy number and various numeric input, start key 103 for specifying read and copy start, clear key 104 for returning the numeric value conditions to default value, stop key 105 for specifying the cancellation of a reading operation or print operation, panel reset key 106 for initializing the copy mode and the like, print display 107 for displaying whether or not printing is possible, read display 108 for displaying whether or not reading is possible, job confirm key 109 for displaying whether or not a job is present and specifying changes, and memory recall key 110 for specifying memory recall. The memory recall key 110 is effective only when memory recall is set to an enabled state, and also may be displayed on the liquid crystal touch panel 101 only when memory recall is enabled.

Figure 4:
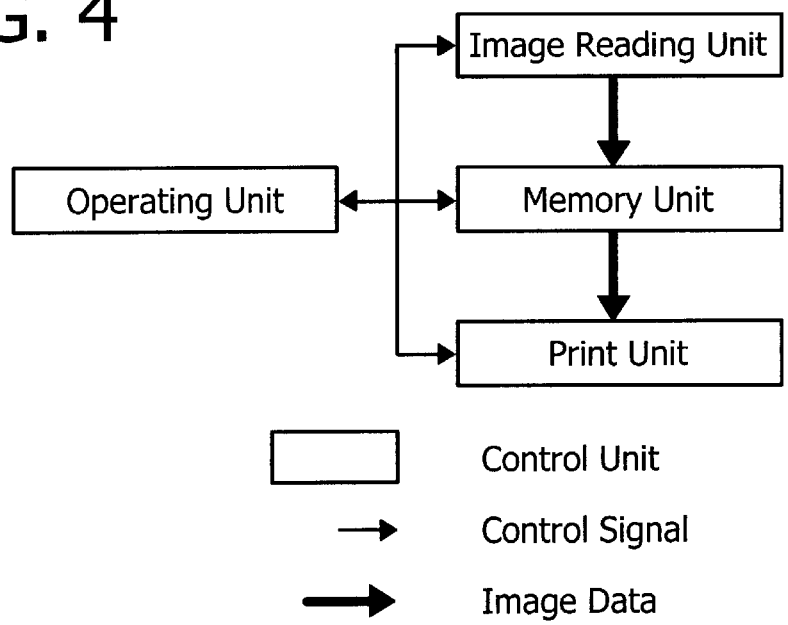
FIG. 4 is a block diagram of the overall structure of the copier of the first embodiment.

FIG. 4 is a block diagram showing the overall structure of the copier 1 of the first embodiment. The copier 1 comprises an operating unit (A) (operation panel OP and the like) for accomplishing control command input and control of the copier 1, image reading unit (B) (scanning system 10, image processor 20 and the like) for reading a document and converting the document to image signals, memory unit (C) (memory unit 30 and the like) for storing image data, and print unit (D) (print processor 40, optical system 60, image forming system 70 and the like).

Figure 5:
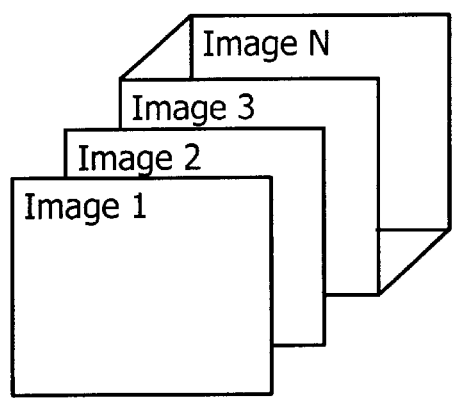
FIG. 5 shows the structure of the memory unit shown in FIG. 4.
Figure 5:
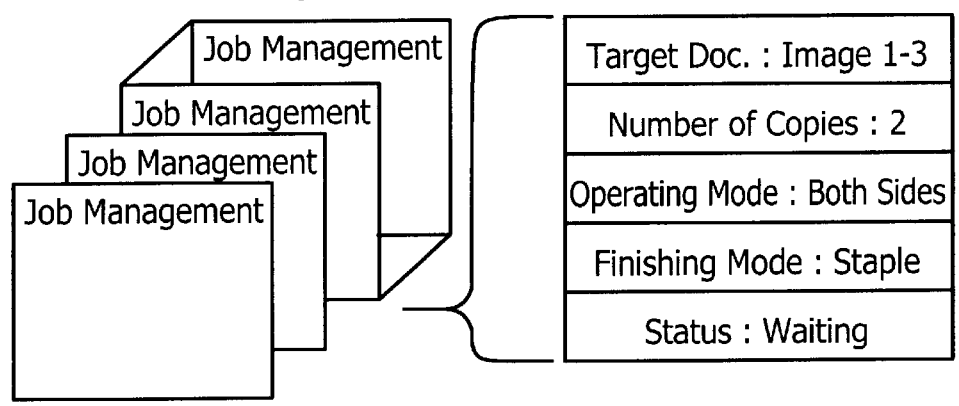

FIG. 5 is a structural view of the memory unit (C) shown in FIG. 4. The memory unit (C) includes an image management table (a), and a job management table (b). Image data read by the reading unit (B) is managed by the image management table (a), and jobs recorded by the operating unit (A) are managed by the job management table (b). Image data of a target job, number of copies (copy number), operating mode, sort mode, status (current job condition) and the like are managed by the job management table (b).

Figure 6:
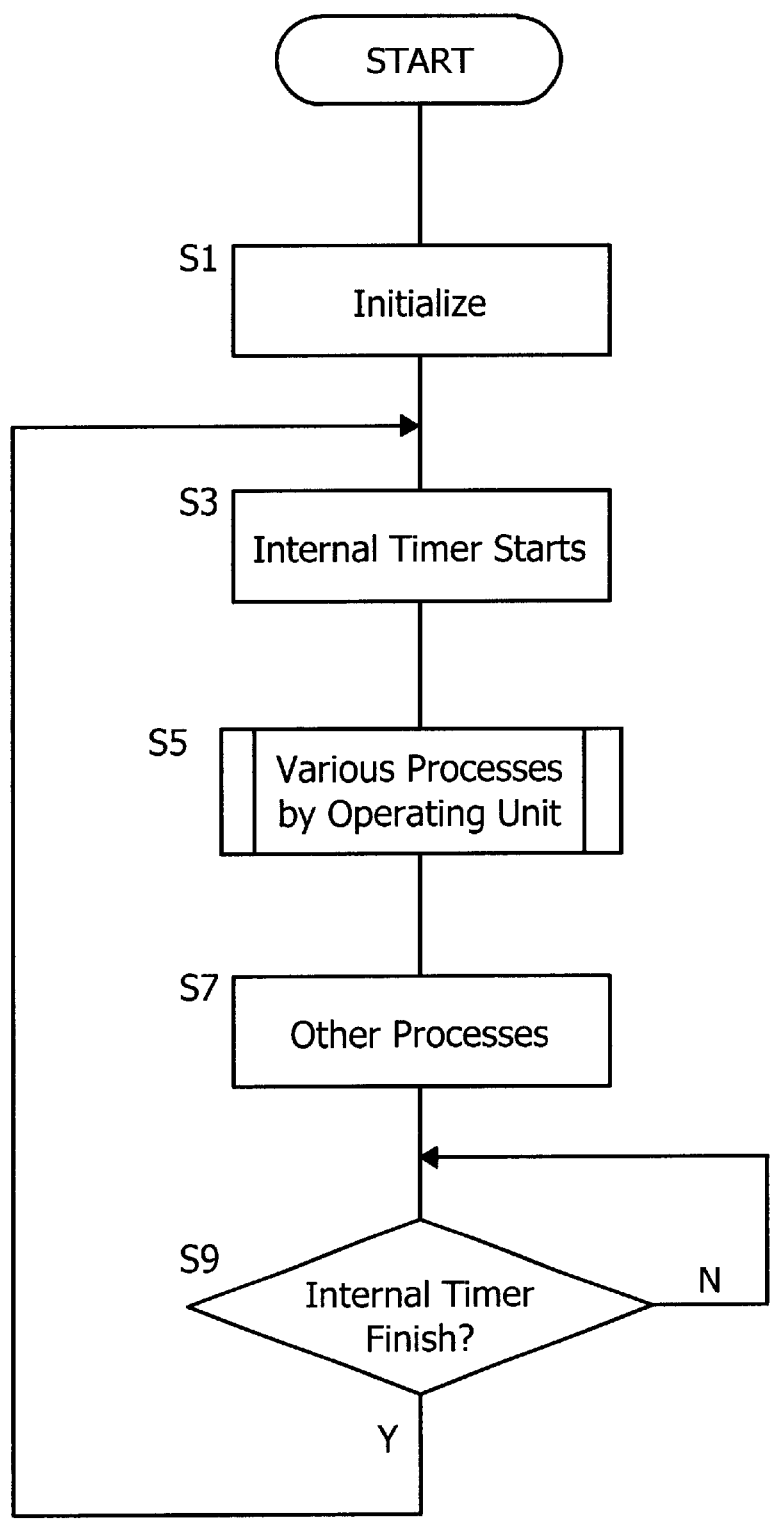
FIG. 6 is a main flow chart of the processing flow executed in the copier of the first embodiment.

FIG. 6 is a main flow chart showing the processing flow of the copier 1 of the present embodiment.

Referring to FIG. 6, when the power source of the copier 1 is turned ON, the program of the main flow chart in FIG. 6 is started. First, each part is initialized (S1). Thereafter, an internal timer is started (S3), The internal timer is set at an initial value beforehand in the initialization process of step S1.

Then, various types of processes (S5) by the operating unit (A), and other processes (S7) are sequentially executed.

When the processing of all subroutines ends, the timeout of the internal timer is awaited (S9), whereupon one routine cycle ends, and the operation returns to step S3.

The processes described above are repeated in the copier 1.

Figure 7:
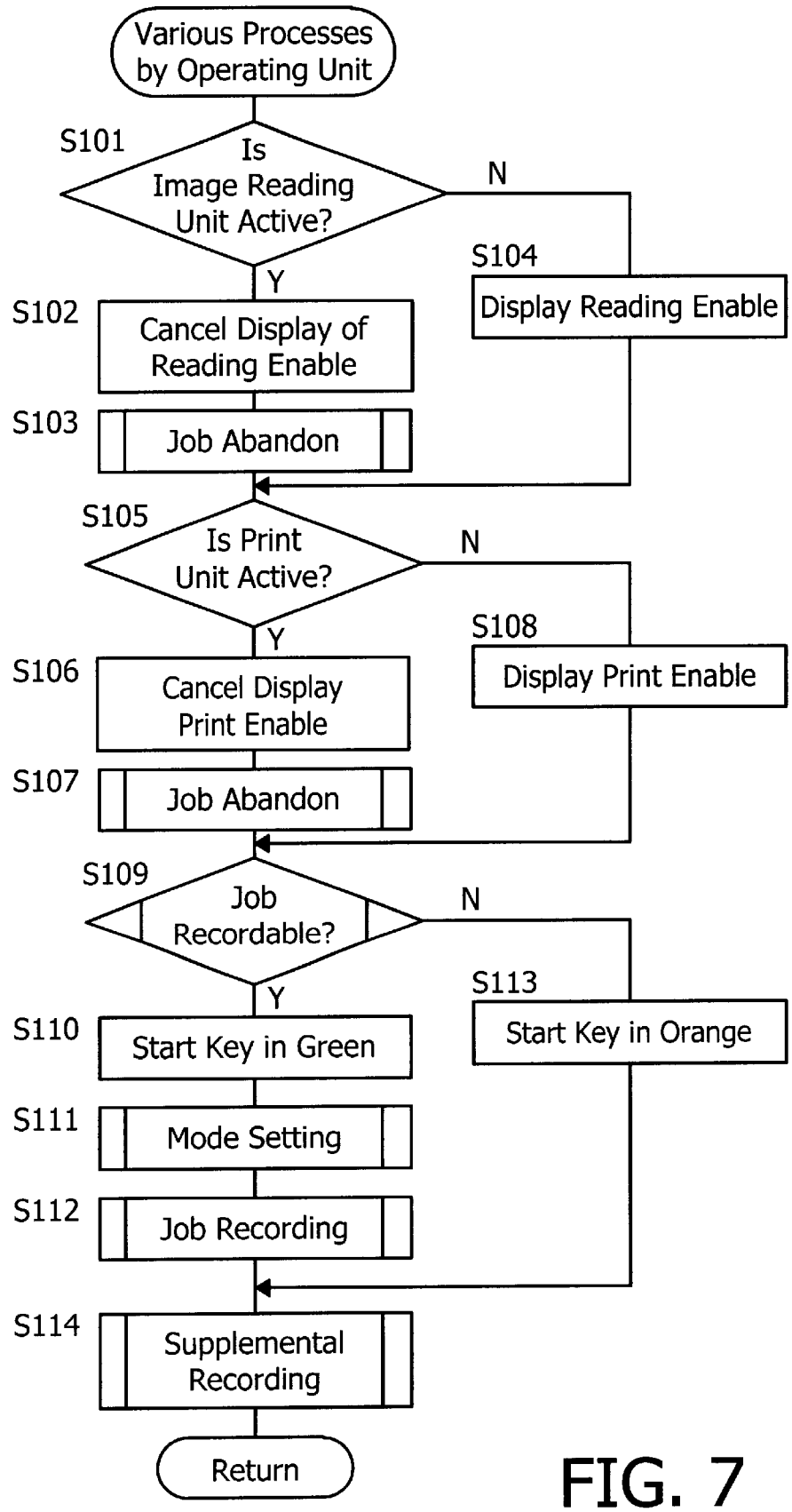
FIG. 7 is a flow chart showing the processes performed by the operating unit and executed in step S5 of FIG. 6.

FIG. 7 is a flow chart showing the process executed by the operating unit (A) in step S5 of FIG. 6.

Referring to FIG. 7, when the reading unit (B) is in an active state, i.e., when a reading operation is on-going or a reading is (temporarily) stopped (S101: YES), the reading unit (B) cannot begin a reading operation for a new job, and the operating unit (A) deactivates the display showing reading is enabled on the read display 108 on the operation panel OP (S102). In this case, a cancellation process can be executed for the target job in accordance with a user request (S103). When the reading unit (B) is not in an active state, i.e., when a reading operation is not on-going and reading is not (temporarily) stopped (S101: NO), the reading unit (B) can start a reading operation for a new job, and the operating unit (A) displays an indication that reading operation is enabled on the read display 108 (S104).

Similarly, when the print unit (D) is in an active state, i.e., when a print operation is on-going or printing is (temporarily) stopped (S105: YES), the print unit (D) cannot start a print operation for a new job, and the operating unit (A) deactivates the display of print operation enabled on the print display 107 on the operation panel OP (S106). In this case, a cancellation process can be executed for the target job in accordance with a user request (S107). When the print unit (D) is not in an active state, i.e., when a printing operation is not on-going and printing is not (temporarily) stopped (S105: NO), the print unit (D) can start a print operation for a new job, and the operating unit (A) displays an indication that print operation is enabled on the print display 107 (S108).

The operating unit (A) determines whether or not a job is recordable (S109). When a job is recordable (S109: YES), the start key 103 is illuminated in green (S110), whereas when a job is not recordable (S109: NO), the start key is illuminated in orange (S113). When a job is recordable, the mode setting process (S111), and job recording process (S112) are executed.

Regardless of the determination as to whether or not a job is recordable and in whichever state, a supplemental recording process of a previously recorded job may be executed in conjunction with a request by a user (S114).

Figure 8:
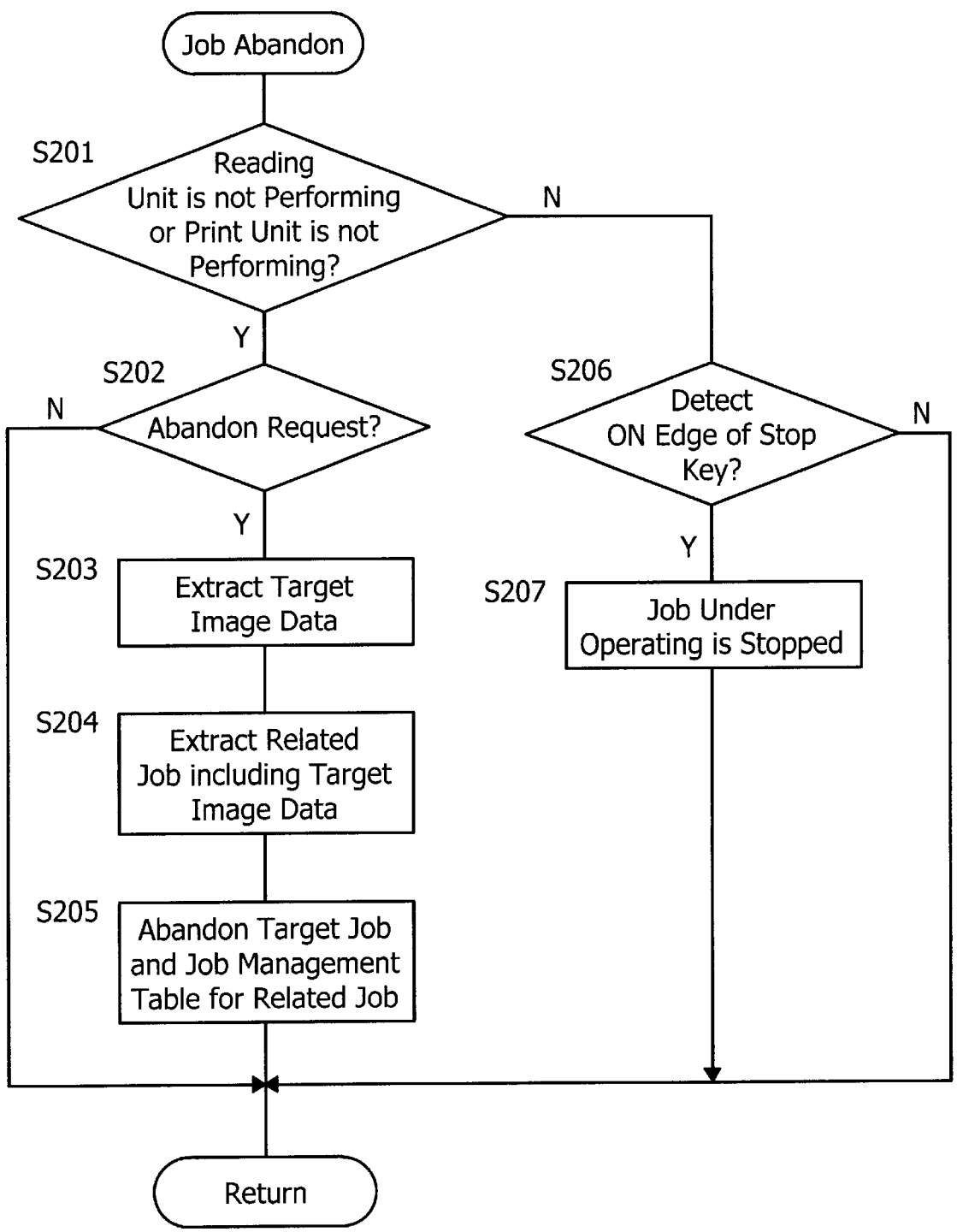
FIG. 8 is a flow chart showing the job destruction process executed in step S103 or S107 of FIG. 7.

FIG. 8 is a flow chart showing the job cancellation process executed in steps S103 and S107 of FIG. 7. By this process, a user can cancel a plurality of jobs including the target image data for the job being canceled. For the job cancellation process to be executed, at least one of the reading unit (B) or print unit (D) must be in an active operational state.

Referring to FIG. 8, when the reading unit (B) is not performing a document reading operation, and the print unit (D) is not performing a print operation (S201: YES), the operating unit (A) can receive a cancel command from a user (S202).

When the reading unit (B) is executing a document reading operation, or when the print unit (D) is executing a printing operation (S201: NO), if a user presses the stop key 105 (S206: YES), the job of the current operation is stopped (S207). In this stopped state, the operating unit (A) can receive a cancel command (S201: YES).

When the reading unit (B) is executing a document reading operation, or when the print unit (D) is executing a printing operation (S201: NO), if a user has not pressed the stop key 105 (S206: NO), the reading operation and print operation continues, and a cancel command is not received.

In order to execute a cancel command, a user presses the memory recall key 110 directly after the target job to be canceled has been recorded (hereinafter referred to as "target job"). When the memory recall key 110 is pressed, the operating unit (A) extracts the memory recall target (including job management table (b) of the target job) image data (hereinafter referred to as "target image data") recorded in the memory unit (C) (S203), and displays the memory recall screen shown in FIG. 9. The memory recall screen is displayed on the liquid crystal touch panel 101.

The memory recall function is a function executed when a user has enabled memory recall, and is a function which holds image data read directly previously in memory for a specific time. Furthermore, when the specific time has not yet elapsed and the power source of the copier 1 is turned off, or new image data have been read, or panel reset key 106 has been pressed, the memory recall function loses function relative to the target image data, and a user cannot perform a memory recall for that image data. When a user presses the memory recall key 110, image data residing in memory can be called up. In the present embodiment, a user enables memory recall beforehand.

When a user touches an erase key 111 on the memory recall screen shown in FIG. 9, the operating unit (A) extracts jobs (hereinafter referred to as "related jobs") that include target image data in the job management table (b), from all jobs recorded in memory unit (C) (S204). The result is displayed on the related jobs extraction screen shown in FIG. 10. The related jobs extraction screen is displayed on the liquid crystal touch panel 101.

When a user confirms a related job on the related job extraction screen shown in FIG. 10 and selects erase, the target job and the related job management table (b) are erased from memory unit (C), and cancellation of the jobs is executed (S205).

When a user cancels all of a plurality of jobs recorded with the same image data by the aforesaid process, the jobs are not individually specified with a cancel command one by one, but rather all jobs including the target image data are extracted and canceled in a single operation.

The recording process for recording a plurality of jobs with the same image data is executed in step S112, and step S114. Details of these steps are described later.

Figure 11:
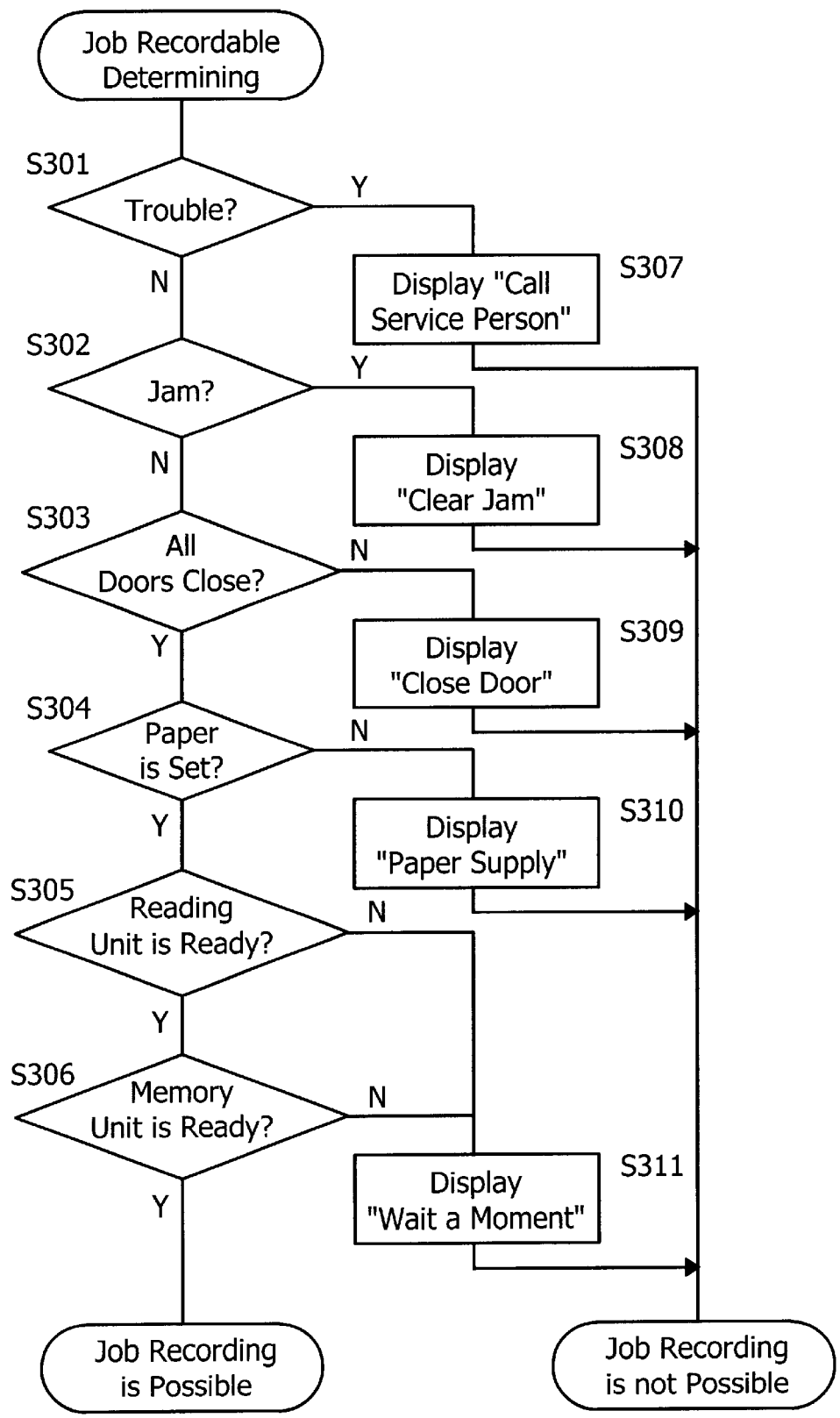
FIG. 11 is a flow chart showing the flow of the determination as to whether or not job recording is possible that is executed in step S109 of FIG. 7.

FIG. 11 is a flow chart showing the flow of the determination of whether or not job recording is possible, as executed in step S109 of FIG. 7. The operating unit (A) determines that job recording is possible when it has been confirmed that there is no trouble (S301: NO), no jam (S302: NO), all doors are closed (S303: YES), there is paper in the cassette (S304: YES), the reading unit (B) is initialized and ready (S305: YES), and the memory unit (C) is initialized and ready (S306: YES). At other times (S301~S302: YES; S303~S306: NO), the operating unit (A) issues the respective warning display (S307~S311), and determines job recording is not possible.

Figure 12:
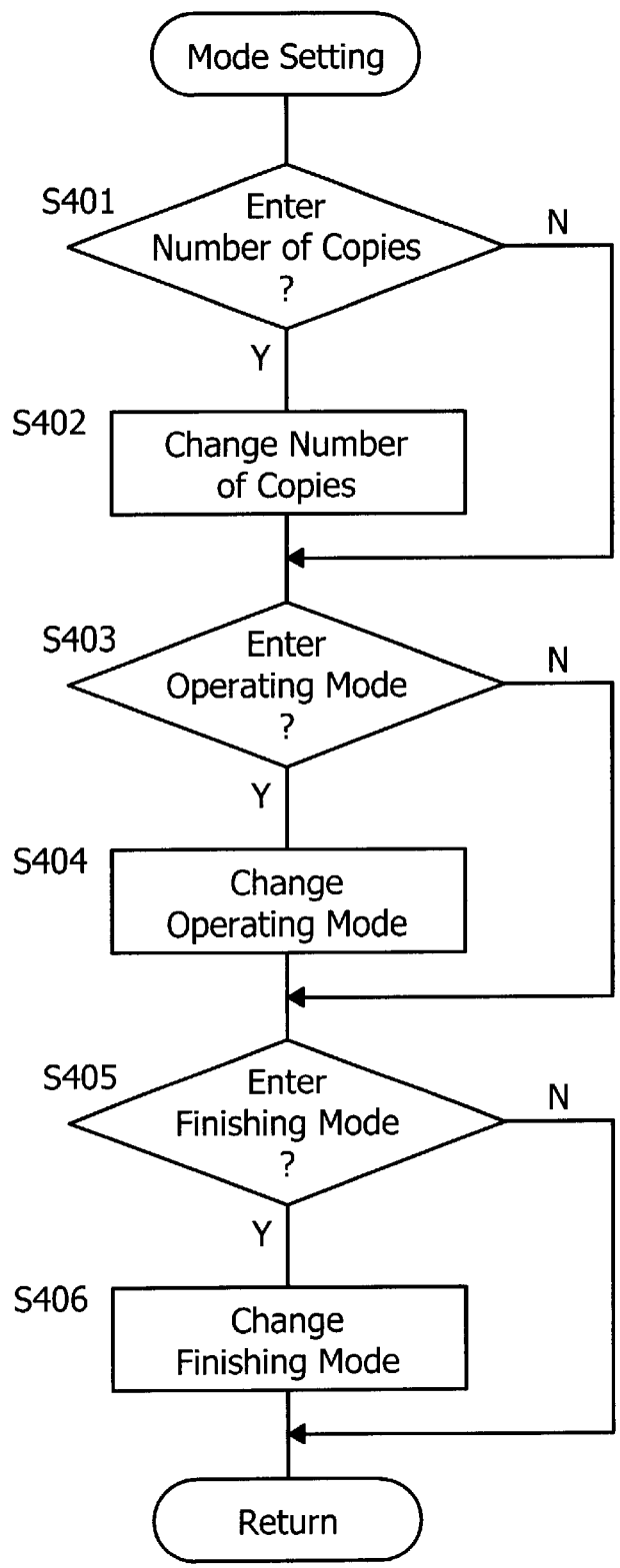
FIG. 12 is a flow chart showing the mode setting process executed when job recording is possible in step S111 of FIG. 7.

FIG. 12 is a flow chart showing the mode setting process executed when job recording is possible in step S111 of FIG. 7. A user sets a mode for job recording priority, and job recording is executed with the set mode attached to the image data.

Referring to FIG. 12, relative to the initial values and numerical values previously set for the recorded job, the operating unit (A) changes the number of copies in accordance with number of copies input by the user in step S401 (S402), changes the operating mode in accordance with the operating mode input by the user in step S403 (S404), changes the sort mode in accordance with the sort mode input by the user in step S405 (S406), and sets the mode. When there is no input (S401, S403, S405: NO), the mode is set directly using the initial values or numerical values set for the recorded job, and no changes are made.

Figure 13:
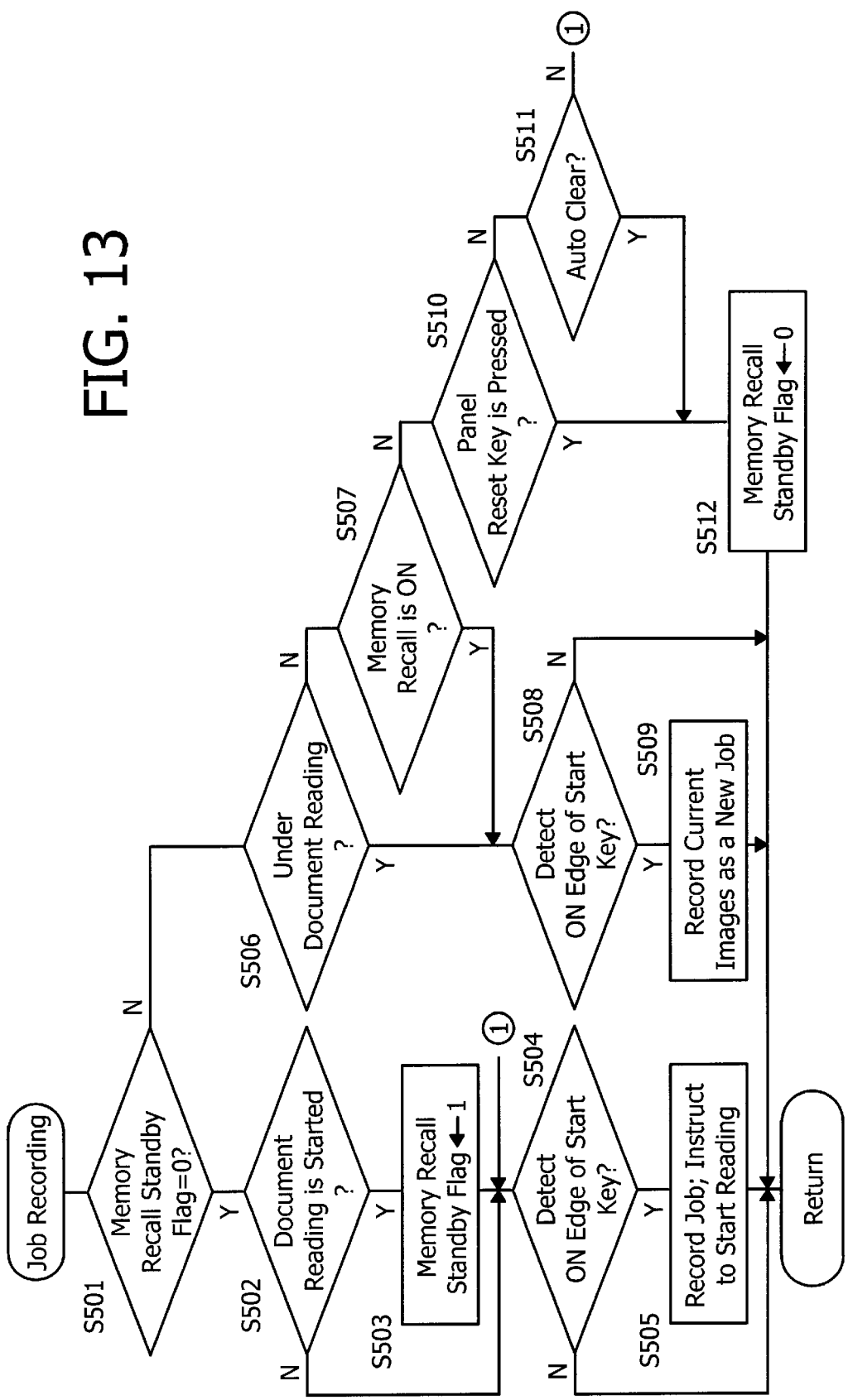
FIG. 13 is a flow chart of the job recording process executed after the mode is set in step S112 in FIG. 7.

FIG. 13 is a flow chart showing the job recording process executed after the mode has been set, in step S112 of FIG. 7.

Referring to FIG. 13, when the memory recall standby flag (initial value "0") is set at "0" (S501: YES), i.e., when document reading is started without image data specified as a memory recall target (S502: YES), the memory recall standby flag is set at "1" (S503), and memory recall becomes possible for the image data being read.

When a user presses the start key 103 (S504: YES), the reading unit (B) is instructed to read the document. The read image data have the mode data that was set in step S111 attached thereto, and are recorded in the job management table (b) as a new job in the memory unit (C) (S505).

When the memory recall standby flag is set at "1" (S501: NO), i.e., when image data are specified as a memory recall target, the user presses the start key 103 and while the reading of the new document is being executed (S506: YES), the user again presses the start key 103 (S508: YES). Then, a job management table (b) of the new job of the read image data can be recorded in the memory unit (C) (S509).

When the aforesaid memory recall state is possible, a user presses the memory recall key 110 to start memory recall of the image data, and presses the start key 103 (S508). In this way the user can record in the memory unit (C) a new job management table (b) corresponding to the image data of the memory recall target (S509).

Before the user presses the start key 103 in step S508 described above, if the various settings have been changed in the mode setting process of step S111, the read image data or memory recall image data are recorded as a new job with the changed setting mode attached. At this time, the operating unit (A) sets the read image data or memory recall image data and the changed mode setting (S111) as a new job, and records the job management table (b) of this new job in the memory unit (C) (S509).

When the memory recall standby flag is set at "1" (S501: NO), i.e., when image data are specified as a memory recall target, and a new document is not read (S506: NO) and memory recall is not executed (S507: NO), if the user has pressed the panel reset key 106 (S510: YES) or a specific time (e.g., 1 minute) has elapsed without key operation, the auto clear is executed (S511: YES), the memory recall standby flag is set at "0", and the memory recall target image data specified when the memory recall standby flag was set at "1" cannot be recalled from memory (S512).

In step S511, when auto clear is not executed (S511: NO) and a user presses the start key 103 (S504: YES), the reading unit (B) is instructed to read the document. The read image data have the mode set in step S511 attached, and are recorded in the memory unit (C) as a new job of the job management table (b) (S505).

By the aforesaid job recording process, it is possible for a user to record a normal job, then set a new mode for memory recallable image data for image data currently being read or image data already read, and record the image data as a new job in the job management table (b). That is, a user can quickly make settings to obtain copies in a different format using the same document data group.

Figure 14:
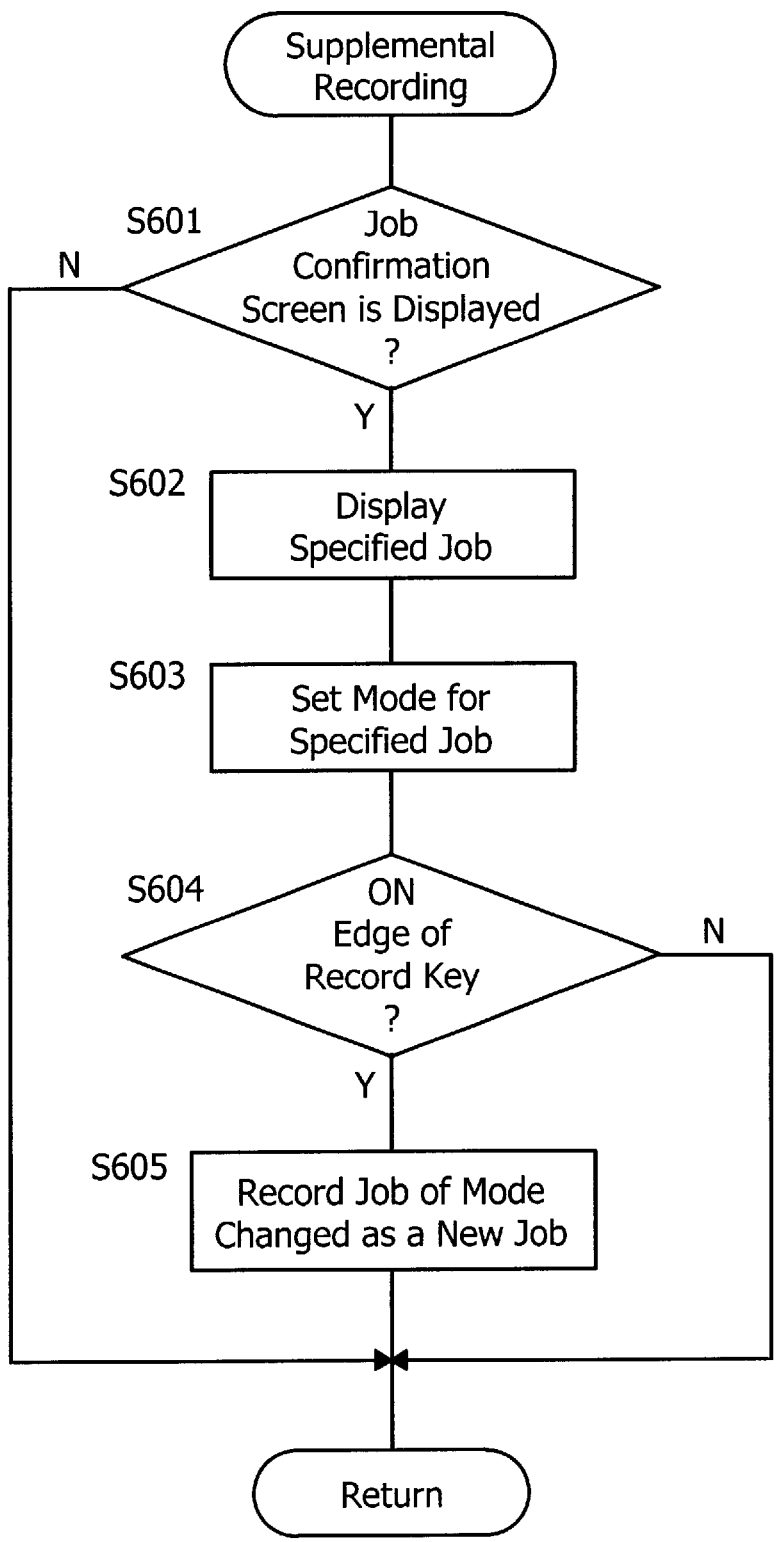
FIG. 14 is a flow chart showing the previous recorded image job recording process executed after job recording in step S114 of FIG. 7.

FIG. 14 is a flow chart showing the supplemental job recording process executed after job recording in step S114 of FIG. 7. By this process, a user does not record a new job from recallable image data in a memory, but rather executes a supplemental recording process that a user can record a job for image data, which are no longer memory recallable but one of previously recorded jobs, as a new job.

When a user presses the job confirmation key 109 on the operation panel OP, the job confirmation screen shown in FIG. 15 is displayed on the liquid crystal touch panel 101 (S601: YES). When the user touches the supplement key 112 to specify the desire to record a supplemental job from among the list 113 of a plurality of jobs recorded previously, the specified job is displayed on the job supplement screen shown in FIG. 16 (S602), and the mode of the specified job can be changed. In the job supplement screen, the user changes the setting of the mode for the specified job (S603). When the user touches the record key 114 (S604: YES), the job for which the mode has been changed is set as a new job, and a job management table (b) is generated separately from the original specified job, and is recorded in the memory unit (C) (S605).

By means of the aforesaid previous image job recording process, when a specific time has elapsed, and a subsequent reading has been executed, a user can change the mode and set a job previously recorded but which is not recallable from memory, and record this job as a new job.

The previous image job recording process is executable for an existing job even when it is determined that job recording is not possible and regardless of the result of job recordability determination in step S109.

Furthermore, if a user sets a job as non-erasable even when copying is completed and the job ends, the image data included in the job as well as the job history are saved. Accordingly, a user can call a previously executed job from the job history even after any number of recorded jobs have been executed, and can set that job as a separate job with changed mode and the like.

Second Embodiment

In the first embodiment, image data included in a job are limited to an image read by the reading unit (B), however, image data can also be received by the print controller. In the second embodiment, reception by the print controller is described.

The image processing device of the present embodiment is a copier 1 identical to that of the first embodiment, and its structure is shown in FIGS. 1 and 2. Only aspects differing from the first embodiment are discussed below.

In the present embodiment, the memory unit 30 of the copier 1 is connected to a personal computer through an external cable 91 via an external device connector 90.

The memory unit 30 functions as an interface with external devices, and exchange of image data and control data is executed through the memory unit 30.

Figure 17:
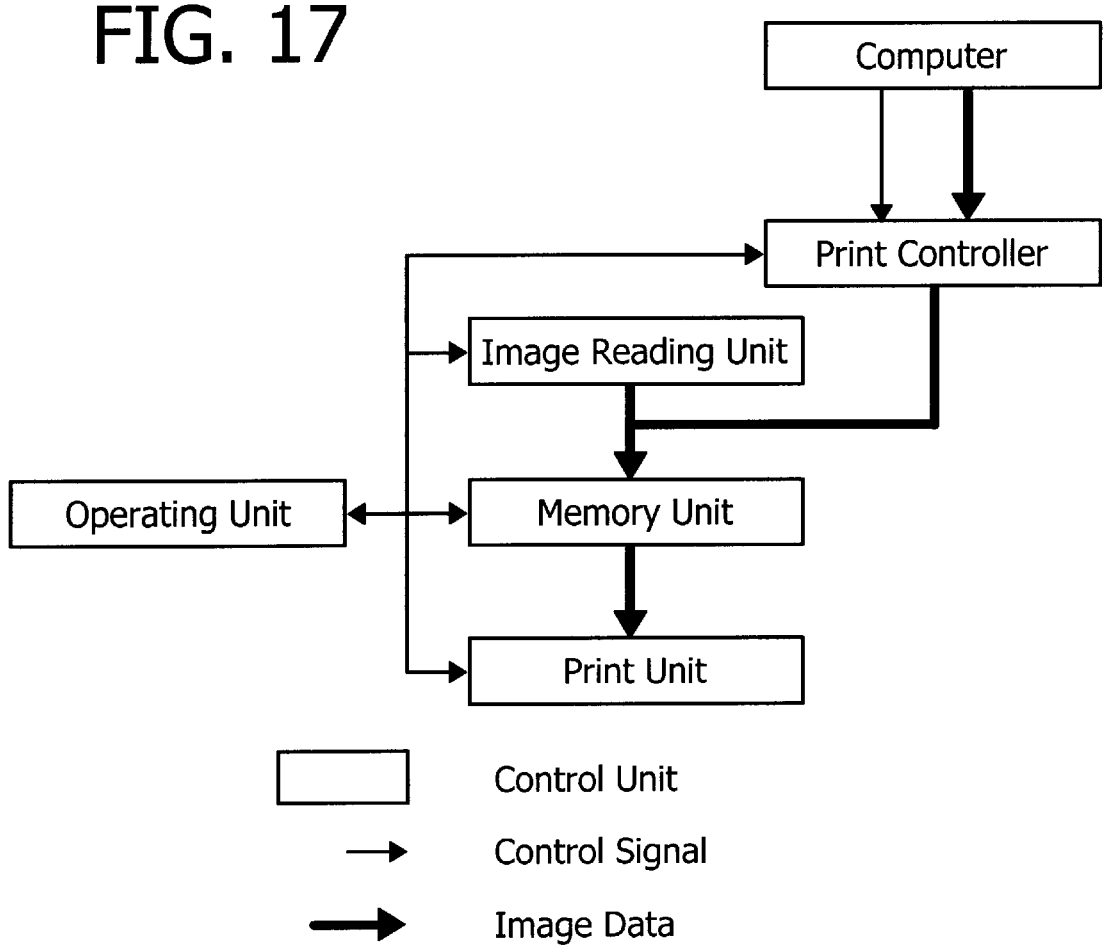
FIG. 17 is a block diagram showing the overall structure of a copier of as second embodiment.

FIG. 17 is a block diagram showing the overall structure of the image processing system of the present embodiment. The image processing system comprises an operating unit (A), image reading unit (B), memory unit (C), print unit (D), print controller (E) (external interface), and computer (F). Image data transmitted through the computer (F) received by the print controller (E) are input to the memory unit (C) equivalent to image data read by the reading unit (B), and the management of such image data is also equivalent. The structure of the memory unit (C) is identical to that of the first embodiment, and is shown in FIG. 4.

In the first embodiment, the operation of starting image data reception in steps S502 and S506 in the job recording process is executed when a user presses the start key 103, however, in the second embodiment, image data reception occurs from the computer (F) connected to the print controller (E), and the operation of the operating unit (A) of the image processing device is unnecessary. The operating unit (A) detects an image reception condition by the print controller (E) via the control signal shown in FIG. 17, and job recording is executed identically to the document reading operation of the reading unit (B).

As described above, since the start of image data reception is accomplished by the operation of the computer (F), when the start key 103 is pressed in step S504, the reading start instruction is delivered to the reading unit (B), and a reception start instruction to the print controller (E) is not delivered.

Image data received by the print controller (E) are handled identically to image data read by the reading unit (B), and the processing executed is identical to that of the first embodiment.

Although in the first and second embodiments, the image processing device of the present invention is described in terms of a digital copier, the present invention is also applicable to image copying devices such as facsimile devices, printers and the like.

In the foregoing examples, cancellation is specified with respect to a given job, and all other jobs relating to the same image data are identified and also canceled. In addition, or alternatively, the cancellation can be specified for given image data. In this case, all jobs relating to that image date are identified and canceled.

The disclosed embodiments are in all aspects only examples, and the present invention is not limited to these embodiments. The scope of the present invention is specified by the scope of the claims and not by the description, and includes all modifications insofar as such modifications are equivalent in the scope and meaning to the scope of the claims.

What is claimed is:

1. An image processing device comprising:
   an image data input device;
   a print mode input device;
   a first recording device that records a job in accordance with image data input by the image data input device and a print mode input by the print mode input device;
   a memory that stores a job recorded by the first recording device;
   a mode changer for changing a print mode input by the print mode input device;
   a second recording device that records as a new job the image data input by the image data input device in accordance with a print mode changed by the mode changer;
   a device that generates a destroy command specifying a specific job among a group of jobs already recorded by the first and second recording devices;
   an extracting mechanism that extracts another job having identical image data but a different print mode as the job specified by the destroy command; and
   a destroying mechanism that destroys a job specified by the destroy command, and another job extracted by the extracting mechanism.

2. The image processing device claimed in claim 1 further comprising a memory recall mechanism capable of recalling and outputting the job stored by the memory;
   wherein the mode changer is effective only when the memory recall mechanism is operable.

3. The image processing device claimed in claim 2, wherein, when the memory recall mechanism is operable, a time period is established, from the start of reading of a memory recall target job until cancellation of the memory recall function, during which the memory recall mechanism is operatable.

4. An image processing method comprising:
   a first input step of inputting image data;
   a second input step of inputting a print mode;
   a first recording step of recording a job in accordance with image data input in the first input step and a print mode input in the second input step;
   a memory step for storing a job recorded by the first recording step;
   a mode changing step for changing a print mode input in the second input step;
   a second recording step for recording as a new job the image data input in the first input step in accordance with a print mode changed in the mode changing step;
   a receiving step for receiving a destroy command specifying a specific job among a group of jobs already recorded in the first and second recording steps;
   an extracting step for extracting another job having identical image data but a different print mode as the job specified by the destroy command; and
   a destroying step for destroying a job specified by the destroy command, and another job extracted during the extracting step.

5. An image processing device, comprising:
   a memory for storing data of one or more images to be reproduced;
   an input device for inputting a set of conditions for the reproduction of image data;
   a control unit for storing an input set of conditions in said memory as a job pertaining to associated image data, and for storing multiple input sets of conditions pertaining to the same image data as separate respective jobs associated with said image data; and
   means responsive to a command to cancel a stored job associated with given image data for identifying each of the stored jobs associated with said given image data and removing each of said jobs from said memory in response to said command.

6. The image processing device of claim 5 wherein said removing means also removes said given image data from said memory in response to said command.

7. The image processing device of claim 5 further including a display which displays an identification of all of the stored jobs in said memory that are associated with given image data for confirmation by a user.

8. The image processing device of claim 7 wherein said identifications are displayed in response to a memory recall command.

9. The image processing device of claim 8 wherein input conditions for plural jobs pertaining to the same image data can be entered after said memory recall command is executed.

10. The image processing device of claim 5 wherein said memory comprises:
    a first area for storing the images to be reproduced; and
    a second area for storing a plurality of jobs, wherein each job includes a reference to at least one image stored in said first area, and at least one other parameter relating to the reproduction of the referenced image.

11. A method for processing images, comprising the steps of:
    storing data pertaining to at least one image to be reproduced;
    storing a set of conditions that pertain to the reproduction of an image as a job, wherein each different set of conditions that pertains to the same image data is stored as a separate job;
    receiving a command to cancel at least one of a specified stored image or a job that pertains to said specified image;
    identifying each stored job that pertains to said specified image; and
    erasing each of the identified jobs in response to said command.

12. The method of claim 11 further including the step of erasing the data for said specified image in response to said command.

13. The method of claim 11 further including the step of displaying all of the stored jobs that have been identified, for confirmation by a user.

14. A memory containing a program which executes the following steps in the operation of an image processing device that stores different sets of conditions that pertain to common image data as separate jobs:
    receiving a command to cancel a stored image or at least one job that pertains to said stored image;
    identifying each stored job that pertains to said stored image; and
    erasing each of the identified jobs in response to said command.

* * * * *